United States Patent [19]

Tröster

[11] Patent Number: 4,815,792
[45] Date of Patent: Mar. 28, 1989

[54] ANTI-BLOCKING SYSTEM

[75] Inventor: Harry Tröster, Tamm, Fed. Rep. of Germany

[73] Assignee: Daimler-Benz Aktiengesellschaft, Stuttgart, Fed. Rep. of Germany

[21] Appl. No.: 161,179

[22] Filed: Feb. 26, 1988

[30] Foreign Application Priority Data

Feb. 28, 1987 [DE] Fed. Rep. of Germany ....... 3706661

[51] Int. Cl.$^4$ .......................... B60T 8/34; B60K 28/16
[52] U.S. Cl. .................................... 303/113; 180/197;
188/181 R; 303/92; 303/96; 303/100; 303/110
[58] Field of Search ................... 303/92, 96, 100, 113, 303/106; 180/197; 188/181 R

[56] References Cited

U.S. PATENT DOCUMENTS

| | | | |
|---|---|---|---|
| 3,972,568 | 8/1976 | Fleischer | 303/100 |
| 4,320,506 | 3/1982 | Farazi et al. | 303/92 X |
| 4,480,309 | 10/1984 | Burckhardt et al. | 303/96 X |
| 4,511,971 | 4/1985 | Dittner et al. | 303/110 X |

FOREIGN PATENT DOCUMENTS 3339285 5/1984 Fed. Rep. of Germany.
3531157 3/1987 Fed. Rep. of Germany.

*Primary Examiner*—Andres Kashnikow
*Assistant Examiner*—Matthew C. Graham
*Attorney, Agent, or Firm*—Barnes & Thornburg

[57] ABSTRACT

In an anti-blocking system for a road vehicle with statically pressure-actuatable brake circuits, a pressure modulator with an outlet pressure connected with the wheel brake cylinder is coordinated to each wheel brake, whereby pressure reduction-, pressure build-up and pressure-maintaining-phases of the anti-blocking regulation are attainable by its controllable volume change respectively maintaining constant of its volume. The pressure modulators are constructed as stepped cylinders with bore steps of different diameters passing over one into the other, in which a smaller and a larger control pressure space is movably delimited by piston steps of corresponding different diameters of a stepped piston, as well as the outlet pressure space, which is formed by an annular space remaining between the piston steps. The larger control pressure space is permanently connected with the main brake line of the respective brake circuit. One pressure inlet control valve each is connected between the outlet pressure space of the respective pressure modulator and the main brake line, whose base position is the passage position, and which, for the purpose of the anti-blocking regulation is adapted to be activated into the closing position. A function-control valve is further provided for each wheel brake, by way of which an auxiliary pressure source, also valve-controlled, is adapted to be connected to the smaller control pressure space. The output pressure $P_A$ is higher by a minimum amount, for example, 10 to 30 bar than the maximum output pressure $P_B$ of the brake pressure control apparatus multiplied with the ratio $F_1/F_2$ of the areas $F_1$ and $F_2$ of the larger piston step and of the smaller piston step.

25 Claims, 3 Drawing Sheets

ANTI-BLOCKING SYSTEM

BACKGROUND AND SUMMARY OF THE INVENTION

The present invention relates to an anti-blocking system for a road vehicle equipped with a hydraulic multi-brake installation in which a pressure modulator is coordinated to each of the wheel brakes adapted to be subjected to the regulation which has an output pressure space connected to the respective wheel brake, by way of which a brake pressure produced by means of the brake device is adapted to be coupled into the wheel brake cylinder, respectively, cylinders of this wheel brake.

An anti-blocking system of this type is the subject of the non-pre-published German Patent Application DE 35 31 137 Cl.

In the anti-blocking system described therein for a vehicle with four-wheel drive and with a brake installation having front axle-/rear-axle brake circuit division, which is combined with a propulsion-regulating arrangement, a tandem-master cylinder adapted to be actuated by way of a brake force-servo unit of customary type of construction is provided for the actuation of the brake installation, which includes a pressure outlet coordinated to the rear axle brake circuit and a pressure outlet coordinated to the front axle brake circuit. A pressure modulator of its own is coordinated to each of the wheel brakes which according to construction and function is analogous to a master cylinder for a single-circuit brake installation, that is, has still a single outlet pressure space with which the respective wheel brake is connected. For the actuation of the pressure modulator in the sense of a brake pressure build-up, the output pressure of the tandem-master cylinder is coupled to an inlet-pressure space of the pressure modulator, which is delimited pressure-tight by a piston flange against a follower space, which is in communicating connection with the brake fluid reservoir container of the brake apparatus and in its turn is delimited against the output pressure space by a second flange, which is delimited housing-fixedly by a partition wall of the modulator housing, through which a plunger-shaped extension of the modulator piston passes and is sealed off against the same. A piston movably delimiting a control pressure space engages at the end of this plunger-shaped extension, by the pressure actuation of which with the output pressure of an auxiliary pressure source, the modulator piston is adapted to be pushed back against the brake pressure established in its inlet space, as a result of which a volume enlargement of the outlet pressure space and thereby a pressure reduction-phase of the anti-blocking regulation is attainable. Pressure-maintaining phases are adapted to be controlled in that the control pressure space is adapted to be closed up against the auxiliary pressure source—valve-controlled—, and in that also the wheel brakes are adapted to be closed off, valve-controlled, against the pressure outlet of the pressure modulator.

The construction of the pressure modulator, explained so far, which is required for the realization of the anti-blocking regulation, requires already a considerable structural length which corresponds at least to that of a tandem master cylinder of usual construction and is further increased in that for the realization of the propulsion-regulation function a further actuating pressure space must be provided, by the pressure actuation of which—also valve-controlled—the piston is displaceable in the outlet pressure space of the pressure modulator in the sense of a pressure build-up also without actuation of the brake device. For the required sealing of the piston against the housing of the modulator, at least four slide seals are required, even if the modulator is designed only for the anti-blocking regulation, and, if the pressure modulator must also be constructed for the realization of a propulsion regulation, at least two further annular seals become necessary whose friction must be overcome also during a normal braking.

An anti-blocking system realized in this manner therefore entails at least the following disadvantages:

1. Large space requirement of the pressure modulators,
2. Relatively high susceptibility to trouble because of numerous annular seals prone to wear, and
3. High friction losses which are conditioned by the annular seals and which may lead to the fact that the brake installation requires disproportionately high actuating forces in case of a failure of the brake force servo unit so that the brake installation under unfavorable conditions is still hardly actuatable and/or a failure of the brake installation altogether is misleadingly indicated to the driver.

The anti-blocking system of a similar type disclosed in the German Offenlegungsschrift DE 33 39 285A1 entails essentially the same disadvantages, in which pressure modulators individually coordinated to the wheel brakes are constructed as 1/1-pressure converters, whereby, corresponding to the front axle/rear axle brake circuit division, the pressure modulators coordinated to the two front wheel brakes and the pressure modulators coordinated to the two rear wheel brakes are combined into a pressure modulator cylinder each by means of a common housing. These pressure modulators have each a control pressure space and an outlet pressure space which are delimited with respect to one another housing-fixedly by a partition wall and are movably limited by one piston flange each, which are securely connected with each other by a piston rod that displaceably passes pressure-tight through a central bore of the partition wall. The outlet pressure spaces, with which one of the wheel brakes each is connected, are thereby arranged in the mutually remotely arranged end sections of the cylinder bore each accommodating two pressure modulators, which are each closed off pressure-tight by a plug. The piston flanges of the modulator pistons movably limiting the control pressure spaces are displaceably guided pressure-tight in a central section of the cylinder bore extending between the two partition walls and form at the same time boundaries movable in the axial direction of an anti-blocking control pressure space extending between the same, which is adapted to be alternately connected by way of an outlet valve and an inlet valve with the pressureless tank, respectively, the high pressure output of an auxiliary pressure space provided for the anti-blocking control. The control pressure spaces of the pressure modulators provided for the front wheel brakes are connected to one pressure outlet each of a brake device constructed as tandem master cylinder. The control pressure spaces of the pressure modulators coordinated to the rear wheel brakes are connected by way of one proportional valve each to the control pressure space of the pressure modulator which is coordinated to the front wheel brake of the same vehicle side so that an H-brake circuit division is provided as regards the brake actuation. The purpose of these proportional valves is thereby to keep the brake pressure increase at the rear wheel brakes smaller than at the front wheel brakes during a normal braking, i.e., during a braking not subjected to the regulation, in order to take into consideration in this manner the dynamic unloading of the rear axle and to anticipate a blocking tendency at the rear axle. During a normal braking, the modulator pistons experience—in the brake-pressure-build-up phase—a displacement in the sense of an increase of their control pressure spaces and a corresponding reduction of their outlet pressure spaces whereby the anti-blocking control pressure spaces extending between two pressure modulators are relieved in the direction to the tank of the auxiliary pressure source by way of their outlet valves disposed in the open position. If a blocking tendency occurs at the front and/or the rear axle, then the outlet valve of the respective anti-blocking control pressure space is activated into its closing position and the inlet valve, closed up to then, into the open position thereof, and as a result thereof, the high output pressure of the auxiliary pressure space is coupled into the respective anti-blocking control pressure space, which has as a consequence that the modulator pistons of both pressure modulators coordinated to the front wheel brakes and/or to the rear wheel brakes move "apart", that is, in the sense of an increase of their outlet pressure spaces and therewith in the sense of a reduction of the brake pressure in the connected wheel brakes. The activation of the inlet and outlet valves is thereby—meaningfully—so made that the anti-blocking regulation at the front axle operates according to the so-called "Select High" principle, that is, the regulation of the front axle starts when a blocking tendency occurs at both front wheels, and takes place at the rear axle according to the "Select Low" principle, that is, a pressure actuation of the anti-blocking control pressure spaces of the pressure modulators coordinated to the rear wheel brakes, producing the brake pressure reduction at both rear wheel brakes, takes place "already" when a blocking tendency occurs exclusively at one of the two rear wheels of the vehicle. As regards the regulation, a front axle-/rear axle brake circuit division is thus selected in the known anti-blocking system.

The two piston flanges of the modulator pistons are displaceably sealed against the bores delimiting the control pressure space and the outlet pressure space in the radial direction by means of one annular seal fixedly arranged at the piston. The piston rod connecting with each other the two piston flanges of the pressure modulators, is sealed off against the partition wall bore by means of a housing-fixedly arranged annular seal. The annular seals fixed at the piston are thereby constructed as sealing sleeves whose outer sealing lips are pressed radially outwardly by the pressure prevailing in the space under consideration in good sealing abutment with the respective bore wall. Such a sealing sleeve is also arranged at the piston flange offsetting the control pressure space of the pressure modulator against the anti-blocking control pressure space on the side facing the anti-blocking control pressure space in order to reliably preclude that during the anti-blocking regulation operation pressure medium can flow over from the anti-blocking control pressure space into the brake pressure control pressure space of the respective pressure modulator which would impair the function of the anti-blocking regulation. Four annular seals per modulator are thus provided also with the pressure modulators of this further known ABS which entail considerable friction losses. Owing to the pairwise symmetrical arrangement, as viewed in the axial direction, of two pressure modulators each with respect to the transverse center plane of the anti-blocking control pressure space extending perpendicularly to the central axis, an unfavorably great structural length results for the pressure modulation cylinders which further considerably exceeds that of a customary tandem-master cylinder. The know anti-blocking system thus entails at least the disadvantages as regards the space requirement of its hydraulic unit as the anti-blocking system according to the DE 35 31 157C1.

The object of the invention is therefore to improve an anti-blocking system of the aforementioned type to the effect that it can be realized, also in the case of a combination with a propulsion-regulation installation with considerably smaller technical expenditure, especially considerably more simple construction of the pressure modulators and smaller space requirement thereof, possesses a considerably smaller trouble proneness, and therebeyond assures that also in case of a failure of the brake force servo unit, the pedal-actuating force required for achieving a still adequate braking deceleration remains within acceptable limits.

The underlying problems are solved according to the present invention by the features to be described more fully hereinafter.

The pressure modulators provided in accordance with the present invention as brake pressure-adjusting members for the anti-blocking regulation, which in the pressure-reduction phases act like an intermediate reservoir for brake fluid drained out of the wheel brakes subjected to the regulation and in the pressure build-up phases, analogous to a single-circuit master cylinder, respectively, to a pressure converter, as long as the outlet pressure space of the respective pressure modulator is closed off against the brake device, are extraordinarily simple as regards construction and are realizable with small space requirement which enables altogether a compact construction of the hydraulic unit of the anti-blocking system. As the stepped or differential pistons providing the movable boundaries of the control pressure spaces of the pressure modulators and their outlet pressure spaces remain "stationary" in their base positions during a normal braking, i.e., a braking not subjected to the regulation, whereby the output pressure space of the respective pressure modulator acts exclusively like a section of constant cross section of the brake line branch leading from the master brake line to the respectively connected wheel brake, on the one hand, the wear of the seals provided within the frame of the pressure modulators is reduced to a minimum and, on the other, it is also avoided that in case of a failure of the brake force servo unit, disproportionately high actuating forces become necessary in order to attain a still adequate minimum deceleration of the vehicle.

According to another feature of the present invention, a preferred dimensioning of the auxiliary source which is favorable for the functioning safety of the anti-blocking system according to the present invention, whose outlet pressure is adapted to be coupled into the control pressure spaces of the pressure modulators, is obtainable if the minimum amount, by which the outlet pressure $P_A$ of the auxiliary pressure source is higher than the maximum attainable outlet pressure of the brake device multiplied with the ratio of the areas of the differential pistons of the pressure modulator, has a value between 30 bar and 60 bar and preferably has a value of about 50 bar.

The hydraulic separation resulting from the construction of the pressure modulators provided according to the present invention of the function-control circuit which leads from the auxiliary pressure source by way of the function control valve to the control pressure space movably delimited by the smaller piston step of the respective pressure modulator, from the brake pressure-control circuit providing the brake pressure coupling into the respective wheel brake, which leads by way of the outlet pressure of the respective pressure modulator changeable as regards its volume, enables without difficulty to utilize a different working medium in the function-control circuit than the brake fluid used in the brake pressure supply circuits. However, it is preferred to use brake fluid as working medium also in the control circuit. A leakage oil space between the control pressure space and the outlet pressure space of the pressure modulator which is otherwise necessary and is to be kept pressureless, can be dispensed with thereby, and a single, preferably housing-fixedly arranged annular seal suffices in order to seal off the control pressure space against the outlet pressure space of the pressure modulator. Both the number of the wear-prone seals is minimized thereby as also structural length is "economized."

The pressure modulators of a brake circuit including two wheel brakes may thereby be combined without difficulty into a structural unit, appropriately the pressure modulators of those wheel brakes which have the same displacement volume, that is, the pressure modulators of the rear wheel brakes, on the one hand, and the pressure modulators of the front wheel brakes on the other.

An operationally reliable, simple construction of the pressure modulators can be achieved in that a central bore step is arranged between the bore step accommodating the smaller piston step and the bore step accommodating the larger piston step, whereby the diameter of the central bore step has a value between the diameters of the larger and of the smaller piston step, and in which the pressure outlet channel, by way of which the wheel brake cylinder is connected to the respective pressure modulator outlet pressure space, terminates in the outlet pressure space inside of this central bore step.

According to another feature of the present invention, both the electronic technical control expenditure as also the space requirement necessary for the pressure inlet-control valves can be reduced by the use of hydraulically actuatable pressure inlet-control valves.

According to still another feature of the present invention, additional safety is achieved by the use of hydraulic auxiliary control circuit that the pressure-inlet control valves and/or the function-control valves reach with the start of a braking the base position to be assumed at least initially. It is understood thereby that these auxiliary control circuit must be designed sufficiently "weak" in order that the electromagnetic or hydraulic control circuits, by means of which the pressure-inlet control valves and/or the function-control valves are activated into their regulating correct functioning positions, remain dominant.

According to a still further feature of the present invention, it can be effectively precluded by a safety installation of simple construction that a malfunction of the auxiliary pressure source may lead during a response of the anti-blocking regulation to an "emptying regulating" of the brake circuit, at which the regulation has become effective and may lead in the extreme case to the failure of the brake installation.

According to another feature of the present invention, an effective propulsion regulation installation (ASR) can be realized in accordance with the present invention by means of additional function elements which are linked with only a slight technical additional expenditure compared to the anti-blocking system of the present invention, under utilization of all function elements of the anti-blocking system, whereby the propulsion regulation installation can be designed both for a vehicle with single-axle drive as also for a vehicle with four-wheel drive.

According to still another feature of the present invention, appropriate control functions, for example, a stepwise brake pressure build-up and reduction in the brake circuit of the driven vehicle wheels, can be controlled in a simple manner by a propulsion-regulation-control valve in accordance with the teachings of the present invention.

Such a control valve also offers the possibility of the activation, advantageous for safety reasons, by means of which it is avoided that an anti-blocking regulation operation starting immediately after a propulsion regulation phase may lead to an emptying regulating of the brake circuit subjected to the regulation in the outlet pressure space of the pressure reducer provided for the propulsion regulation.

In a combined realization of an anti-blocking and of a propulsion regulation, it is particularly advantageous if, according to another feature of the present invention, both the pressure inlet-control valves as also the function-control valves are constructed as electrically controllable valves.

By contrast, according to still another feature of the present invention, the two position valve which provides for closing the main brake line of a brake circuit adapted to be actuated with brake pressure in the course of the propulsion regulation against the coordinated outlet of the brake device, can be constructed as hydraulically controlled valve, whereby the inlet pressure of the pressure reducer provided within the frame of the propulsion regulation installation can be utilized for the shifting control of the two-position valve.

BRIEF DESCRIPTION OF THE DRAWINGS

These and other objects, features and advantages of the present invention will become more apparent from the following description when taken in connection with the accompanying drawing which shows, for purposes of illustration only, two embodiments in accordance with the present invention, and wherein.

DETAILED DESCRIPTION OF THE DRAWINGS

Figure 1:
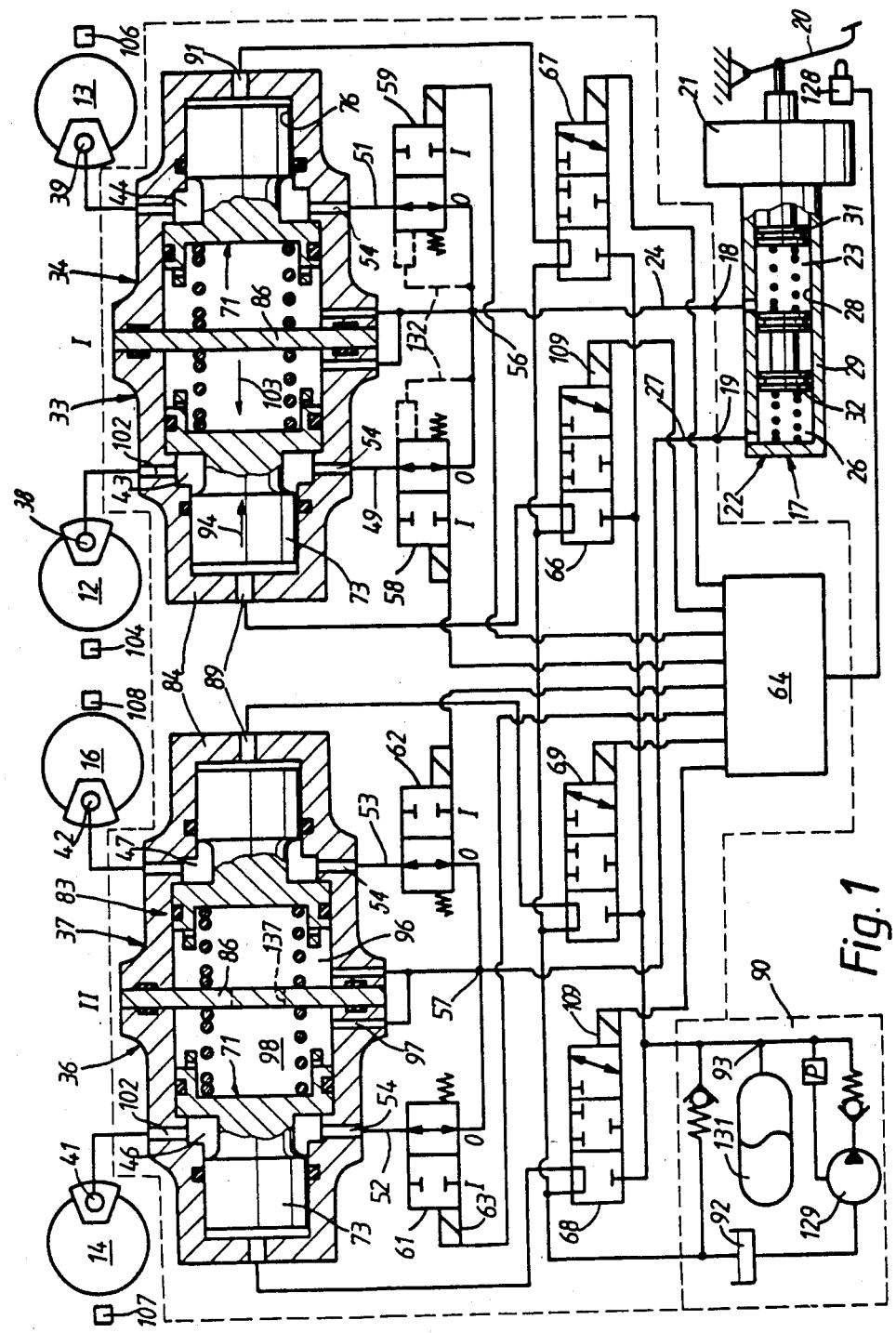
FIG. 1 is a block diagram of a hydraulic two-circuit brake installation with an anti-blocking system according to the present invention having pressure modulators and control valve arrangements individually coordinated to the wheel brakes.

Referring now to the drawing, wherein like reference numerals are used throughout the various views to designate like parts, and more particularly to FIG. 1, to the details of which reference is expressly made, a hydraulic brake installation of a road vehicle is generally designated by reference numeral 10, which is equipped with an anti-blocking system (ABS) generally designated by reference numeral 11. The brake installation 10 is constructed as two-circuit brake installation, in which the wheel brakes 12 and 13 of the left and of the right front wheel of the vehicle are combined into a front axle brake circuit I and the wheel brakes 14 and 16 of the left and of the right rear wheel of the vehicle are combined into a rear axle brake circuit II.

The brake circuits I and II are constructed as closed brake circuits, that is, statically pressure-actuatable brake circuits, for the brake pressure actuation of which a brake device generally designated by 17 is provided, which includes a brake pressure-outlet 18 coordinated to the front axle brake circuit I and a brake pressure-outlet 19 coordinated to the rear axle brake circuit II.

It is assumed for the purpose of the explanation, without limitation of the generality, that the brake device 17 is constructed as tandem master cylinder 22, of known construction as such, adapted to be actuated by means of a brake pedal 20 by way of a brake force servo device 21, which brake device has a primary-outlet pressure space 23 to which is connected the main brake line 24 of the front axle brake circuit I as well as a secondary-outlet pressure space 26 to which is connected the main brake line 27 of the rear axle brake circuit II, whereby inside of the bore 28 of the tandem-master cylinder housing 29 the primary-outlet pressure space 23, as viewed in axial direction, is delimited, on the one hand, by the primary piston 31, at which engages the—hydraulically amplified—pedal-actuating force, and on the other, by a floating piston 32 which also forms the unilaterally movable boundary of the secondary-outlet pressure space 26 which is limited housing fixedly by the end wall 35 of the tandem master cylinder housing 29. The brake device 17 so far described can be realized in any manner, known as such.

The anti-blocking system 11 is constructed in the illustrated special embodiment as a so-called four-channel-ABS which enables an individual regulation of the brake pressures at the individual wheel brakes 12, 13, 14 and 16.

The ABS includes pressure modulators 33 and 34, respectively 36 and 37, individually coordinated to the front wheel brakes 12 and 13 as well as the rear wheel brakes 14 and 16, which have outlet pressure spaces 43 and 44, respectively, 46 and 47 in communicating connection with the wheel brake cylinders 38 and 39 of the front wheel brakes 12 and 13, respectively, the wheel brake cylinders 41 and 42 of the rear wheel brakes 14 and 16, whereby brake pressure-reduction- and brake pressure-build-up-phases of the anti-blocking regulation are controllable by the—controllable—volume changes of the outlet pressure spaces in the sense of an increase or a decrease, as also brake pressure-maintenance- phases, the latter in that the volumes of the outlet pressure spaces 43 and/or 44, respectively, 46 and/or 47 of the pressure modulator 33 and/or 44, respectively, 36 and/or 37, which is coordinated to the wheel brake 12 and/or 13, respectively, 14 and/or 16, subjected to a regulation, is maintained at its instantaneous value.

The brake line branches 49 and 51, respectively, 52 and 53, which lead from the main brake lines 24 and 27 of the front axle-brake circuit I and of the rear axle brake circuit II to the modulators 33 and 34, respectively, 36 and 37, are connected with a brake pressure-inlet 54 communicating with the outlet pressure space of the respective modulator. Pressure-inlet-control valves 58 and 59, respectively, 61 and 62 are connected between the brake pressure-inlets 54 of the pressure modulators 33 and 34 and the branching place 56 of the main brake line 24 of the front axle brake circuit I as well as between the brake pressure-inlets 54 of the pressure modulators 36 and 37 and the branching place 57 of the main brake line 27 of the rear axle brake circuit II, by means of which the brake line branches 49 and 51 of the front axle brake circuit I, respectively, the brake line branches 52 and 53 of the rear axle brake circuit II are adapted to be individually opened up, respectively, closed up against the respective brake pressure-outlet 18, respectively, 19 of the brake device 17. These inlet-control valves 58 and 59 as well as 61 and 62 are constructed in the illustrated special embodiment as 2/2-way solenoid valves whose base position 0 is the passing position. They are controllable individually or several together into the closing positions I by energization of their adjusting magnets 63 with electrical output signals of an electronic control unit 64 of the anti-blocking system.

Furthermore, one function-control valve 66 and 67, respectively, 68 and 69 is provided in conjunction with each of the pressure modulators 33 and 34 of the front axle brake circuit I and of the rear axle brake circuit II, which can each assume three alternative function positions 0, I and II that are coordinated to correspondingly different function conditions of the brake installation 10, respectively, of the ABS 11, namely the brake pressure build-up, both during a normal braking as also in the course of an anti-blocking regulation cycle, as well as brake pressure maintaining and brake pressure reduction phases of the anti-blocking regulation.

However, before reference will be made thereto in detail, also by reference to the further drawing figures, initially the construction and function of the pressure modulators 33 and 34 as well as 36 and 37 of the front-axle brake circuit I, respectively, of the rear-axle brake circuit II, are to be explained more in detail. As these pressure modulators 33, 34, 36 and 37 are identical in their construction in principle and the pressure modulators 33 and 34 of the front axle brake circuit I differ from the pressure modulators 36 and 37 of the rear axle brake circuit II only as regards their dimensioning, it is believed sufficient if the construction of the pressure modulators will be explained with reference to the example of the pressure modulator 33 coordinated to the left front wheel brake 2 which is illustrated on an enlarged scale in FIG. 2, to the details of which reference will now be made.

The pressure modulator 33 includes a stepped or differential piston generally designated by 71 with two piston flanges 72 and 73 of differing diameter $d_1$ and $d_2$ which are displaceably guided pressure-tight in bore steps 74, respectively, 76 of correspondingly different diameter of the modulator housing generally designated by 77 and which in the illustrated embodiment are rigidly connected with each other by a short piston-shaped center section 78 of the piston 77.

A further, short center bore step 79, as viewed in the axial direction, whose diameter $d_3$ corresponds approximately to the average value between the diameters $d_1$ and $d_2$, is present between the larger bore step 74 and the smaller bore step. The center bore step 79 is offset with respect to the larger bore step 74, respectively, the smaller bore step 76 by one annularly shaped step surface 81, respectively, 82 each, whose planes extend perpendicularly to the center longitudinal axis 72 of the pressure modulator housing 77. The housing 77 includes an altogether pot-shaped housing part 83 whose bottom 84 closes off the bore section 76 of the smaller diameter $d_2$ against the outside. At the oppositely disposed side, the modulator housing 77 is closed off by an end face wall plate 86. The piston flange 72 of the modulator piston 71 which is larger in diameter, is constructed pot-shaped whereby the free end face surface 87 of the piston jacket 88 is arranged pointing toward the end face wall plate 86.

Figure 2:
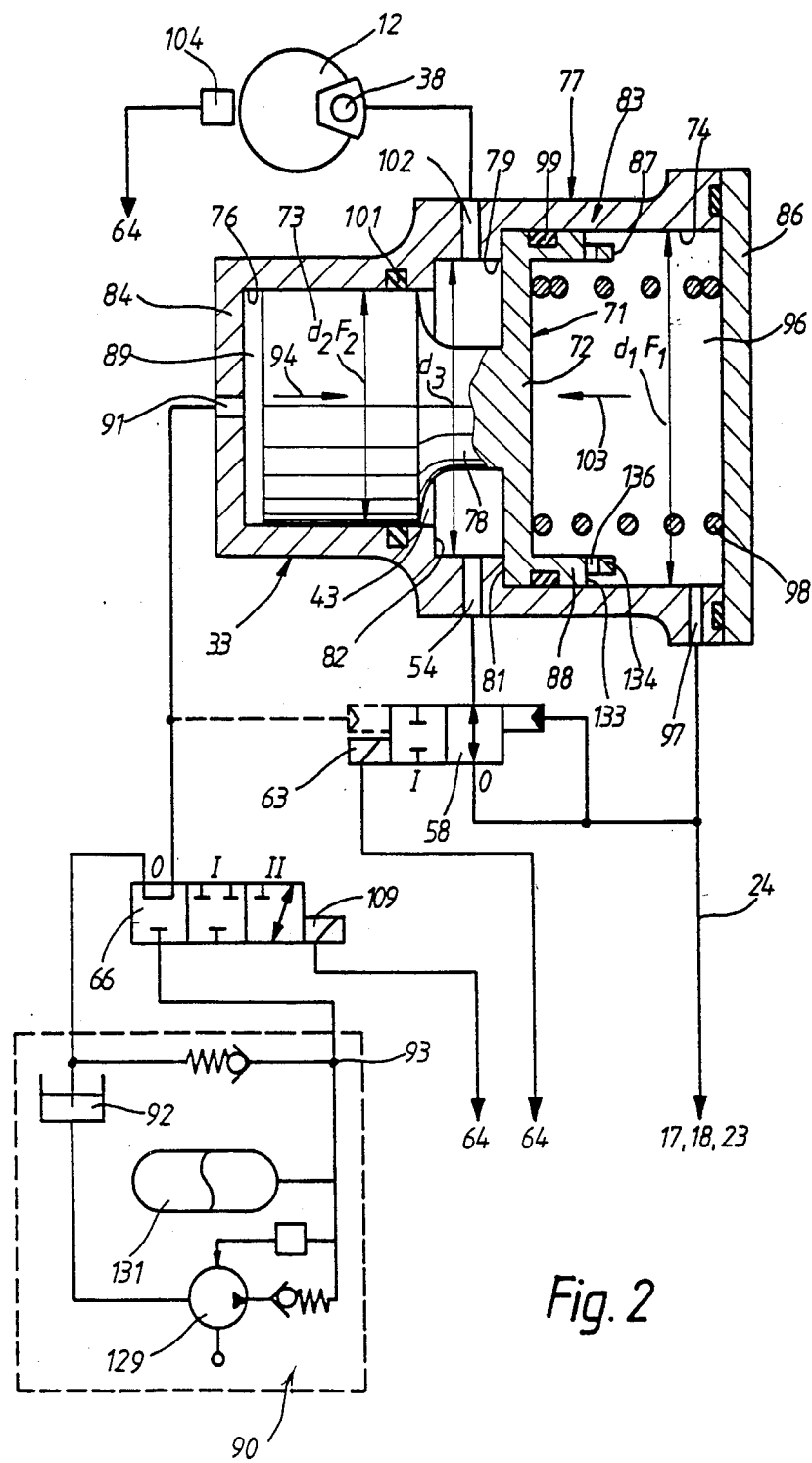
FIG. 2 is a somewhat schematic view illustrating details of a pressure modulator suitable for the brake pressure regulation at the rear wheels of the vehicle including the control elements provided for its activation, and showing the pressure modulator in cross section along a plane containing its central longitudinal axis.

A first control pressure space 89 is movably delimited, in the axial direction, by the piston step 73 of the modulator piston 71 which is smaller in diameter, and is housing-fixedly delimited by the bottom 84 of the pot-shaped housing part 83, whose—sole—control pressure connection 91 which in the illustrated special embodiment terminates centrally in the control pressure space 89, is connected in the alternative function positions 0, I and II of the function-control valve 66 either with the pressureless tanks 92 of an auxiliary pressure source generally designated by 90—in the base position 0 of the function control valve 66—and is thereby pressure-relieved or, in the energized position I of the function control valve 66, is closed off so that a control pressure possibly previously coupled into the control pressure space 89 remains maintained or, in the energized position II of the function-control valve 66, is connected with the pressure output 93 of the auxiliary pressure source 90 maintained at the high output pressure level $P_A$ and is thereby acted upon with pressure in the sense of a displacement of the modulator piston 71 toward the right, according to FIG. 2, in the direction of the arrow 94.

A second control pressure space 96 is movably delimited in the axial direction, by the larger piston flange 72 of the modulator piston 71, and is housing-fixedly delimited by the end face wall plate 86, which second control pressure space is connected by way of a control connection 97 with the main brake line of the respective brake circuit, in the selected embodiment the main brake line 24 of the front axle brake circuit I.

A return spring 98 which is supported, on the one hand, at the bottom surface of the pot-shaped piston flange 72 and on the other at the end-face wall plate 86, is so constructed as regards its prestress and its spring constants that in the pressureless condition of the control pressure spaces 89 and 96 and of the outlet pressure space 46, it is in a position to displace the modulator piston 71 reliably into the illustrated base position connected with the minimum volume of the ring-shaped outlet pressure space 43 against the friction of the piston-fixed annular seal 99, by means of which the pot-shaped piston flange 72 is sealed off against the larger bore step 74, and against the housing-fixed annular seal 101, by means of which the piston flange 73 smaller in diameter is sealed off against the bore step 76 of the modulator housing 77, and to keep the modulator piston 71 in this position in which the larger piston flange 72 is supported at the ring-shaped end surface 81 of the modular housing 77 offsetting the center bore step 79 against the larger bore step 74 and in that, on the other, its prestress increases only moderately when the modulator piston 71 is displaced—by pressure actuation of the first control pressure space 89—into its end position connected with the maximum volume of the outlet pressure space 43, respectively, minimum volume of the second control pressure space 96, in which it is supported with its free end face surface 87 at the end face wall plate 86, that is, that its prestress increases only by an amount that is equivalent to a pressure in the second control pressure space 96 of only a few bar, for example, 4–8 bar.

In a typical construction, the effective cross-sectional area $F_1$, on which the larger piston flange 72 is acted upon with the outlet pressure of the brake device 17 adapted to be coupled into the second control pressure space 96 upon actuation of the brake installation 10, is larger by 30% than the effective cross-sectional area $F_2$ of the smaller piston step 73, on which the same is adapted to be acted upon with the outlet pressure $P_A$ of the auxiliary pressure source 90 adapted to be coupled into the first control pressure space 89. Furthermore, the pressure modulator 33 is so designed and constructed that the volume increase which its outlet pressure space 43 experiences when the piston 71 is displaced from its one end position, the illustrated base position, into its other end position, in which the ring-shaped end face surface 87 of the piston jacket 88 abuts at the end face wall plate 86 of the housing 77, corresponds to that brake fluid volume which upon an actuation of the brake installation 10 must be displaced per wheel brake 12 and 13 into the front axle-brake circuit I in order to build up in the wheel brake cylinders 38 and 39 of the front wheel brakes 12 and 13 the maximum braking pressure. This volume referred to a wheel brake 12, respectively, 13, amounts to between 2 $cm^3$ and 3 $cm^3$, depending on the weight and power class of the vehicle. This dimensioning of the pressure modulator 33 therefore enables—with a pressure inlet-control valve 58 activated into the closing position I—a completely pressure reduction in the wheel brake cylinder 38 by displacement of the modulator piston 71 into the end position thereof corresponding to maximum volume of the outlet pressure space 43.

For explaining the determinative function of the pressure modulators 33 and 34 as well as 36 and 37, of the pressure inlet control valves 58 and 59 as well as 61 and 62 and of the function-control valve 66 and 67 as well as 68 and 69 of the anti-blocking system 11, the example of a braking will now be explained—representative—, in the course of which the anti-blocking system 11 at the left front wheel brake 12 becomes effective, whereby the regulating cycle of the anti-block regulation explained in connection therewith is representative also for anti-blocking regulating cycles occurring at other vehicle wheels at the same time or at other times.

As long as the anti-blocking regulation is not activated during a braking, the pressure inlet-control valve 58 and the function-control valve 66 assume their illustrated base positions 0, in which the wheel brake cylinder 38 of the left front wheel brake 12 is connected by way of the pressure outlet 102 of the pressure modulator 33, the outlet pressure space 43 and the pressure inlet-control valve 58 disposed in its passing position 0 with the pressure outlet 18 of the brake device 17 coordinated to the front axle brake circuit I and the first control pressure space 89 is pressure-relieved toward the tank 92 of the auxiliary pressure source 90 by way of the function-control valve 66 disposed in its base position 0.

As the force $K_1$ resulting from the actuation of the second control pressure space 96 with the outlet pressure $P_B$ of the brake device 17, which urges the modulator piston 71 in the direction of the arrow 103, according to FIG. 2, toward the left, that is, into the base position and is given as to amount by the equation $K_1=F_1.P_B$, is considerably larger than the force $K_2$ resulting from the simultaneous pressure actuation of the outlet pressure space 43 with the outlet pressure $P_B$ and acting in the opposite direction, that is, in the direction of the arrow 94, which is given as to amount by the equation $K_2=P_B.(F_1- F_2)$, the modulator piston 71 is kept in its illustrated base position corresponding to the minimum volume of the outlet pressure space 43, independently of the outlet pressure $P_B$.

A blocking tendency which occurs in the course of the braking at the left front wheel, is being "recognized" by the electronic control unit 64 of the ABS 11, in a manner known as such, from a comparing as well as differentiating processing of the output signals of wheel rotational speed sensors 104, 106, 107 and 108, which are each individually coordinated to the vehicle wheels while monitoring their movement behavior and produce for the instantaneous velocities thereof characteristic electrical output signals.

The electronic control unit 64 in its turn produces from the processing of these signals, activating signals for the pressure inlet-control valve 58 coordinated to the wheel brake subjected to the regulation and for the function-control valve 66 in such a manner that by the different possible shifting position-combinations of these valves 58 and 66 in conjunction with the pressure modulator 33, the braking pressure reduction—braking pressure maintenance- and braking pressure build-up-phases which are necessary for the anti-blocking regulation, are controllable in the sequence corresponding to the regulating purpose.

As the criteria, according to which the regulation takes place, can be assumed to be known as such, it suffices to explain hereinafter the signal combinations and shifting positions of the pressure inlet-control valve 58 and of the function-control valve 66 resulting therefrom which produce the mentioned regulating phases.

In order to achieve the braking pressure decrease-phase initiating a regulating cycle of the anti-blocking regulation, the pressure inlet control valve 58 is activated into its closing position I and as a result thereof the pressure outlet 18 of the master cylinder 17 is decoupled from the outlet pressure space 43 of the pressure modulator 33. At the same time, the function control valve 66 is activated into its energized position II in which the pressure outlet 93 of the auxiliary pressure source 90 is connected to the first control pressure space 89 movably limited by the smaller piston step 73 of the modulator piston 71. As a result thereof, the modulator piston 71 experiences a displacement in the direction of the arrow 94, that is, in the sense of an increase of the volume of the outlet pressure space 43 of the pressure modulator 43 so that by way of the pressure outlet 102 thereof, brake fluid flows back from the wheel brake cylinder 38 into the increasing outlet pressure space 43, whereby the desired brake pressure reduction in the wheel brake cylinder 38 is achieved. It is thereby assumed, of course, that the outlet pressure level of the auxiliary pressure source is sufficiently high in order that the mentioned displacement of the modulator piston 71 can take place against the outlet pressure $P_B$ of the braking device 17 which is still effective in its second control pressure space 96, as well as against the increasing return force of the return spring 98—to be considered as negligible. In practice, it is thereby adequate when the outlet pressure of the auxiliary pressure source 90 is higher by about 70 bar than the maximum outlet pressure $P_B$ of the braking device 17 amounting to about 180 bar to 200 bar.

During such a pressure reduction phase, a brake fluid volume corresponding to the volume increase of the outlet pressure space 43 is "pumped back" from the—reducing—second control pressure space 96 of the pressure modulator 33 into the brake device 17, in the selected embodiment into the primary outlet pressure space 23 thereof, which leads to a reaction noticeable at the brake pedal 20 to the response of the anti-blocking regulation.

If the monitoring of the movement behavior of the vehicle wheel subjected to the regulation now reveals that the blocking tendency thereof subsides before the braking pressure in the regulated wheel brake 12 has dropped completely, then the anti-blocking system 11 reacts thereto with a pressure-maintaining-phase which is initiated in that the function-control valve 66 is shifted from the pressure reduction position II into the pressure maintenance position, the closing position I, whereas the inlet control valve 58 remains activated in its closing position I. The piston 71 of the pressure modulator 33 is thereby hydraulically "locked", so to speak of, against a pressure build-up movement and remains stationary in its position reached during the shifting of the function control valve 66 into the closing position I thereof.

If the monitoring of the movement behavior of the vehicle wheel—which continues to be braked—reveals that the vehicle wheel subjected to the regulation is decelerated less strongly than the remaining vehicle wheels, respectively, a vehicle wheel not subjected to the regulation, from which the electronic control unit 64 "recognizes" that the vehicle wheel subjected to the regulation could transmit more braking force, then the function control valve 66 is again shifted back into its base position 0 whereby the first control pressure space 89 of the pressure modulator 33 is again connected with the pressureless tank 92 of the auxiliary pressure source 90 whereas the inlet control valve 58 continues to remain activated in its closing position I. Under the influence of the outlet pressure $P_B$ of the—still actuated—braking device 17 which continues to be effective in the second control pressure space 96 of the pressure modulator 33, the piston 71 now experiences again a displacement in the direction of the arrow 103, that is in the sense of a reduction of the volume of the outlet pressure space 43, as a result of which brake fluid previously drained out of the wheel brake cylinder 38 is again pumped back into the same and a brake pressure build-up is again achieved in the wheel brake 12. The pressure increase leads, as long as the inlet control valve 58 is kept in its closing position, again to the value which was adjusted in the wheel brake 12 at the beginning of the regulation.

A pressure increase which goes beyond the same, at the wheel brake 12 previously subjected to the regulation—by increased pressure activation by mean of the braking device 17—is possible again only after the inlet-control valve 58 has again been shifted back into its base position 0 after termination of one or possibly several anti-blocking regulating cycles including pressure reduction-, pressure maintenance- and pressure build-up-phases during which its continues to be kept in its closing position I. This shifting back of the inlet control valve 58 into its base position 0 which terminates an anti-blocking regulating cycle, takes place, corresponding to customary regulating criteria, only when the monitoring of the movement behavior of the previously regulated wheel reveals that the same indicates over a minimum time interval of, for example, 100 ms, the same movement behavior as a vehicle wheel not subjected to the regulation or if the vehicle wheel previously subjected to the regulation after an expiration of a pressure build-up phase lasting at least 100 ms rotates with higher circumferential velocity than a vehicle wheel not subjected to the regulation.

In the special embodiment of an anti-blocking system 11 according to the present invention, illustrated in FIG. 1, in lieu of electrically controllable pressure inlet control valves 58, 59, 61 and 62, also hydraulically controlled 2/2-way valves may be used as indicated in dash line, which with the engagement of the pressure reduction position II of the respective function control valve 66 and/or 67, respectively, 68 and/or 69 are activated into their closing position I and remain held in their closing position I also with a subsequent shifting of the respective function control valve into the closing position I thereof.

In the anti-blocking system 11 explained by reference to FIGS. 1 and 2, the function control valves 66 and 67, respectively, 68 and 69 of the front axle brake circuit I, respectively, of the rear axle brake circuit II are constructed each as 3/3-way solenoid valves which are controllable into their energized positions I and II by energization of their adjusting magnets 109 with control currents $I_1$ and $I_2$ of defined different amounts whose typical values are 3A and 6A.

In the anti-blocking system according to FIG. 1, the pressure modulators 33 and 34 which, each viewed by itself, may have the construction explained in detail by reference to FIG. 2, are combined into a compact structural unit 33, 34 in such a manner that the control pressure spaces 96 of the pressure modulators 33 and 34 connected to the main brake line 24 of the front axle brake circuit I are delimited housing-fixedly with respect to one another by a common end face wall plate 86, whereby a construction of the structural unit 33, 34 results symmetrical with respect to the center plane 111 of this end face wall plate 86.

Also, the pressure modulators 36 and 37 are combined into such a structural unit, according to the illustration of FIG. 1.

Appropriately, all four pressure modulators 33, 34 and 36 and 37 of the anti-blocking system 11 are combined constructively into a structural unit in which one common housing part each is provided for the pressure modulator 33 of the left front wheel brake 12 and the pressure modulator 36 of the left rear wheel brake 14, on the one hand, as well as for the pressure modulator 34 of the right front wheel brake 13 and the pressure modulator 37 of the right rear wheel brake 16, as well as a common end face wall plate 86, by means of which the control pressure spaces 96 of the mutually oppositely disposed pressure modulators 33 and 34, respectively, 36 and 37 are limited with respect to one another.

It is understood that also a three-channel ABS can be realized with the pressure modulators 33 and 34 as well as 36 and 37, which operates with individual regulation of the brake pressures at the front wheel brakes 12 and 13 and common regulation of the brake pressure at the rear wheel brakes 14 and 16 according to the Select-Low-principle—stipulated to be known. In this case, a single pressure modulator suffices for the pressure modulation at the rear wheel brakes 14 and 16 which, in practice, may have the same construction as the pressure modulators 33 and 34 required individually for the front wheel brakes 12 and 13 because the displacement volume of the rear axle brake circuit II, that is, the brake fluid volume which must be displaced into the rear axle brake circuit in order to build up within the same a certain braking pressure, corresponds to the displacement volume of one of the front wheel brakes 12, respectively, 13 each.

With the assistance of pressure modulators and the control valve arrangements as well as the electronic control unit and the wheel rotational speed sensors provided for the monitoring of the movement behavior of the vehicle wheels, explained by reference to FIGS. 1 and 2 under the aspect of the anti-blocking regulation, a propulsion regulating installation can be realized also in combination with the ABS 11 with only small technical additional expenditure, which operates according to the principle—known as such—to decelerate a driven vehicle wheel tending to slippage by activation of its wheel brake to such an extent that the driving slippage of this vehicle wheel continues to be kept within a value range compatible with good propulsion acceleration as also with good driving stability.

Figure 3:
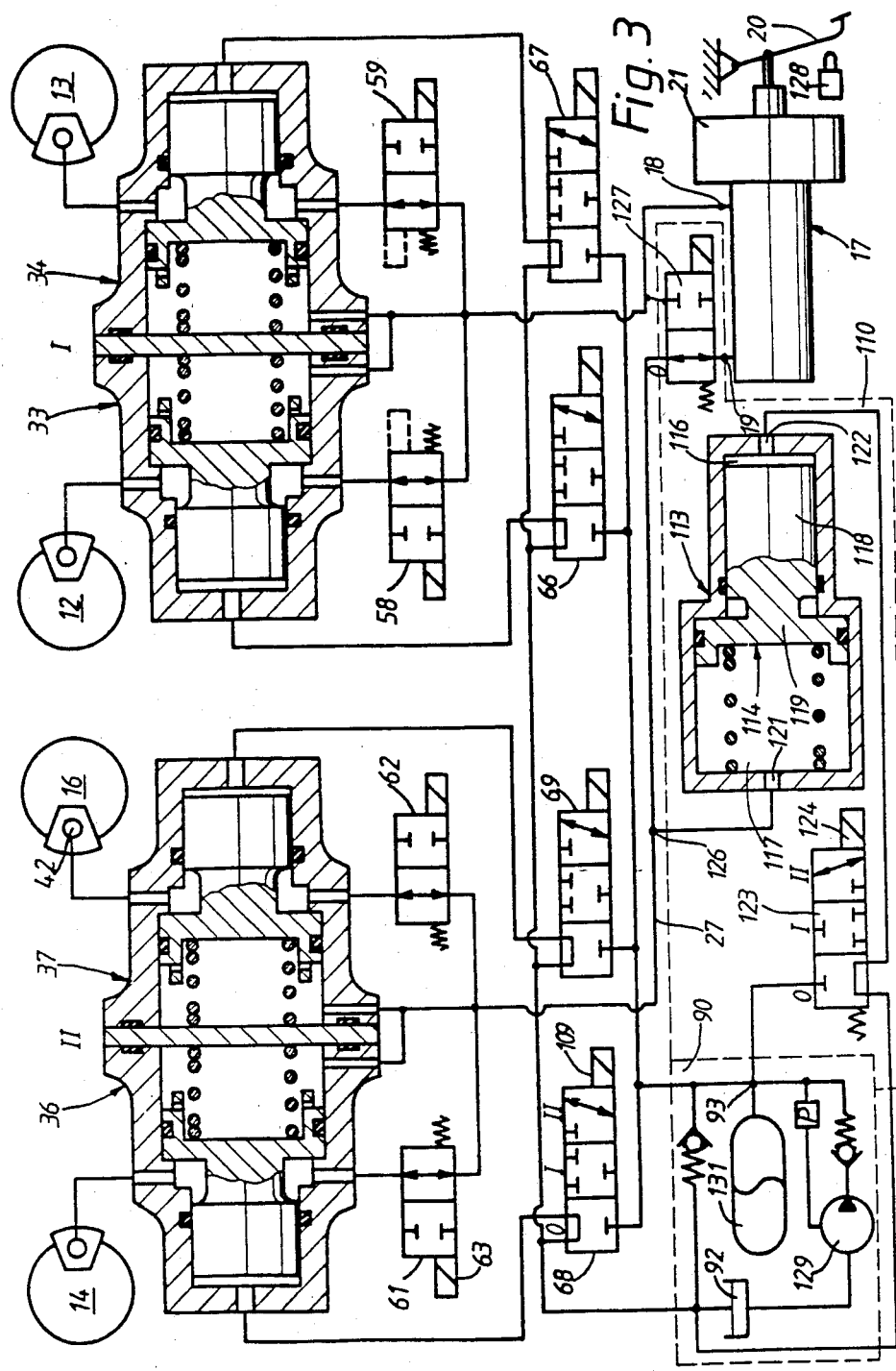
FIG. 3 is a block diagram of a combined anti-blocking-and propulsion-regulation installation in accordance with the present invention, with a showing corresponding to FIG. 1.

For explaining modifications of the anti-blocking system 11 suitable therefor and of additional installations suitable for the propulsion regulation, reference is now made to the details of FIG. 3 which shows in an illustration corresponding to FIG. 1, a brake installation 10 for a vehicle which is equipped both with an anti-blocking system 11 as also with a propulsion regulation installation utilizing the anti-blocking system utilizing the anti-blocking installation in a functionally correct manner, which is represented in FIG. 3 by its completing hydraulic unit generally designated by 110.

For the sake of simplicity, an illustration of the electric control unit and of the input signal lines leading thereto, respectively, the control lines leading from the same to the individual control valves is dispensed with in FIG. 3.

The construction and function elements of FIG. 3, insofar as they are structurally and functionally identical or analogous to those illustrated in FIGS. 1 and 2, are also designated by the reference numerals used in FIGS. 1 and 2 so that insofar as necessary reference can be made to the corresponding descriptive portions and the description of the FIG. 3 can be limited to the modifications and additions.

A propulsion regulation installation 110 operating according to the aforementioned—known—principle, must, without actuation of the brake installation 10 by the driver, provide the following base functions:

1. Brake pressure build-up at least of one wheel brake 14 or/and 16 of the driven vehicle wheels (here the rear axle brake circuit II);
2. Brake pressure build-up at one of the wheel brakes 14 or 16 of the driven vehicle wheels with simultaneous maintenance of the brake pressure at the other wheel brake 16, respectively, 14 at the previously reached value;

3. Maintenance of the brake pressure at one of the wheel brakes 14 or 16 of the driven vehicle wheels with simultaneous pressure reduction at the other wheel brake 16, respectively, 14;

4. Brake pressure build-up at one of the wheel brakes 14 or 16 of the driven vehicle wheels with simultaneous pressure reduction at the other wheel brake 16, respectively 14, and 5. Maintenance of the brake pressure at one or both wheel brakes 14 and/or 16 of the driven vehicle wheels at a value previously reached by the regulation.

The propulsion regulation installation 110 includes a pressure reducer 113 of conventional type of construction, inside of which an inlet pressure space 116 is movably delimited pressure-tight against an outlet pressure space 117 by a stepped or differential piston generally designated by 114. The inlet pressure space 116 is movably delimited by the piston step 118 smaller in diameter while the outlet pressure space 117 is movably delimited by the piston step 119 larger in diameter of the stepped piston 114.

The pressure outlet 121 of the pressure reducer 113 is connected to the main brake line 27 of the rear axle brake circuit II. A propulsion regulation control valve (ASR-control valve) 123 is connected between the pressure inlet 122 of the pressure reducer 113 and the pressure outlet 93 of the auxiliary pressure source 90 which in the illustrated special embodiment is constructed as 3/3-way solenoid valve.

The—illustrated—base position 0 of this ASR control valve 123 is a through-flow position, in which the pressure inlet 122 of the pressure reducer 113 is connected with the pressureless tank 92 of the auxiliary pressure source 90 whereas it is closed off against the pressure outlet 93 thereof. The ASR control valve 123 is adapted to be activated by energization of its control solenoid 124 with a control current $I_2$ whose typical value amounts to 3A, into an energized position I—a closing position—in which the pressure inlet 122 of the pressure reducer 113 is closed off both against the tank 92 of the auxiliary pressure source 90 as also against the pressure output 93 thereof. Furthermore, the ASR control vale 123 is adapted to be activated by a control current $I_2$ of a defined higher amount of, for example, 6A into an energized position II—a pressure build-up position—in which the pressure outlet 93 of the auxiliary pressure source 90 is connected with the pressure inlet 122 of the pressure reducer 113 (and the latter is closed off against tank 92).

A 2/2-way valve 12 of the propulsion regulation installation 110 is connected between the connecting place 126 at which the pressure reducer 113 is connected with the main brake line 27 of the rear axle brake circuit II and the pressure outlet 19 coordinated thereto of the brake device 17, which in the illustrated embodiment is a tandem master cylinder of conventional construction actuatable by way of a vacuum brake force servo unit 21, which 2/2-way valve 127 is adapted to be activated from its illustrated base position 0 in which the pressure outlet 19 of the brake device 17 is connected with the main brake line 27 of the rear axle brake circuit II, into a closing position I in which the pressure outlet 19 of the brake device 17 is closed off against the main brake line 27 of the brake circuit II of the vehicle wheels adapted to be subjected to the propulsion regulation. The 2/2-way valve 127 is kept in its closing position I as long as the propulsion regulation is activated in order to preclude during a regulating cycle of the propulsion regulation a reduction, possible otherwise, of the brake pressure, coupled into the brake circuit II of the driven vehicle wheels by means of the pressure reducer 113, by way of the brake device 17 to the brake fluid reservoir container thereof—not shown.

The 2/2-way valve 127 is preferably constructed as solenoid valve adapted to be activated by output signals of the electronic control unit 64, which remains activated in its closing position I as long as the propulsion regulation is effective.

The pressure reducer 113 of the propulsion regulation installation 110 is so constructed that the brake pressure produced at its pressure outlet 121 and adapted to be coupled into the rear wheel brakes 14 and 16 amounts between 55 and 60% of the pressure adapted to be coupled into its inlet pressure space 116 by way of the ASR control valve 123, which, depending on how long the ASR control valve 123 remains activated in its energized position II in the course of a brake pressure build-up phase of the propulsion regulation, may rise maximum up to the output pressure $P_A$ of the auxiliary pressure source 90.

The pressure inlet control valves 61 and 62, by way of which the outlet pressure of the pressure reducer is adapted to be coupled into the wheel brake(s) 14 and/or 16 of the rear axle brake circuit during regulating phases of the propulsion regulation either alternatively or simultaneously, must in order to be able to fulfill the aforementioned base functions of the regulation, be constructed here as electrically controllable solenoid valves. The blocking valve 127 provided within the scope of the propulsion regulation installation 10 could also be constructed as hydraulically controllable valve, as indicated in dash lines, whose control circuit is adapted to be acted upon with the pressure coupled into the inlet pressure space 116 of the pressure reducer 113.

The propulsion regulation will be explained hereinafter by reference to a regulating cycle selected as an example, how the aforementioned base functions 1. to 5. thereof are attainable by function-correct activation of the pressure inlet control valve 61 and 62, of the function control valve 68 and 69, of the ASR control valve 123 and of the closure valve 127 by output signals of the electronic control unit 64 (FIG. 1) provided both for the ABS 11 as also for the propulsion regulation installation 110, from which a person skilled in the art of electronic and electrohydraulic circuit techniques, can also find the necessary indications how the electronic control unit provided for the ABS 11 has to be modified, respectively, completed in order t be able to control also the propulsion regulation functions.

It is to be assumed initially that a slippage tendency occurs at the right rear wheel of the vehicle which is recognized, for example, from the comparison of the output signal of the wheel rotational speed sensor 108 of this vehicle wheel with the output signal of the wheel rotational speed sensor 106 of the right front wheel of the vehicle—premised as non-driven. Brake pressure must now be built up—exclusively-in the wheel brake cylinder 42 of the right rear wheel brake 16.

For this purpose, an output signal combination is produced by the electronic control unit, by which the ASR control valve 123 is activated into its pressure build-up position II, the 2/2-way solenoid valve 127 series-connected with the rear axle brake pressure outlet 19 of the brake device 17 into the closing position I and the pressure inlet-control valve 61 coordinated to the left rear wheel brake 14 into the closing position I thereof, whereas the pressure inlet control valve 62 coordinated to the right rear wheel brake 16 and the function control valves 68 and 69 of the rear axle brake circuit II remain in their base positions 0 (base function 1, first alternative). If thereafter a slippage tendency also occurs at the left rear wheel, then the brake pressure build-up control valve 61 coordinated thereto is shifted back into its base position 0 in order that braking pressure can be built up also in the left rear wheel brake 14 (base function 1, second alternative). In such a situation, an output signal is also produced by the electronic control unit when and as long as both rear wheels tend to slip and accordingly are decelerated by automatically controlled pressure actuation of their wheel brakes 14 and 16, which output signal triggers a torque-reducing intervention in the—not illustrated—drive aggregate of the vehicle.

For the further course of the regulating cycle, it is assumed that the slippage tendency of the right rear wheel markedly decreases whereas that of the left rear wheel continues to increase. The regulation reacts thereto with a pressure reduction at the right rear wheel brake 16 and a continuation of the build up at the left rear wheel brake 14 (base function 4).

The electronic control unit produces therefor an output signal combination by means of which the pressure inlet control valve 61 of the left rear wheel brake 14 drops back again into its 0 position whereas instead the pressure inlet control valve 62 coordinated to the right rear wheel brake 16 is activated into its closing position and the function control valve 69 also coordinated to the right rear wheel brake is activated into the pressure build-up position II, while the function-adjusting valve 68 coordinated to the left rear wheel brake 14 continues to remain in its base position 0. The ASR control valve 123 continues to be activated in its pressure build-up position II and the 2/2-way-solenoid valve series-connected with the pressure outlet 19 of the brake device 17 continues to be activated in its closing position I.

These function positions of the two last-mentioned valves 123 and 127 are preserved as long as the propulsion regulation is activated which will no longer be mentioned separately hereinafter.

For the further course of the regulation, it is assumed that the left rear wheel continues to tend to slip whereas the slippage tendency of the right rear wheel decreases noticeably so that it is appropriate to continue to further increase the brake pressure in the left rear wheel brake 14 while maintaining that in the right rear wheel brake 16 at the attained value (base function 2).

The electronic control unit 64 produces now an output signal by means of which the function control valve 69 coordinated to the right rear wheel brake is activated into its closing position I whereas the pressure inlet control valves 61 and 62 and the function control valve 68 coordinated to the left rear wheel brake remain in the previously assumed function positions 0, respectively, I, respectively, 0.

If thereafter also the slippage tendency of the left rear wheel decreases whereas at the same time that of the right rear wheel has practically completely faded, then it is appropriate to maintain the brake pressure in the left rear wheel brake at the attained value and to reduce the brake pressure at the right rear wheel brake (base function 3).

The control output signal combination of the electronic control unit suitable therefor is that in which the pressure inlet control valves 61 and 62 of the rear axle brake circuit II are activated into their closing position I, the function control valve 68 coordinated to the left rear wheel brake 14 into the closing position I thereof and the function control valve 69 coordinated to the right rear wheel brake 16 into the pressure reduction position II.

If subsequently the brake pressure attained in the course of the regulation is to be maintained exclusively in the left rear wheel brake for a certain time interval (base function 5), then the output signal combination of the electronic control unit suitable therefor is that in which the pressure inlet control valves 61 and 62 are activated into their closing position I and the function control valve 68 coordinated to the left rear wheel brake into the closing position I whereas the energization of the function control valve 69 coordinated to the right rear wheel brake 16 is discontinued so that the same can drop back into its base position 0.

A pressure decrease operation at the left rear wheel brake 14 terminating this regulating cycle explained as an example is achieved in that the ASR control valve 123 is again shifted back into its base position 0, similarly, the pressure inlet control valves 61 and 62 and the function control valves 68 and 69, and in that subsequently also, possibly after a slight delay interval, the 2/2-way valve 127 series connected with the pressure outlet 19 is also shifted back again into its base position 0—the passage position.

The function positions of the mentioned valves characteristic for the regulating phases explained hereinabove are tabulated in the following table.

TABLE

| Regulating Phases of The Propulsion Regulation | Pressure Inlet Control Valve 61 | Pressure Inlet Control Valve 62 | Function Control Valve 68 | Function Control Valve 69 | ASR-Control Valve 123 | Closure Valve 127 |
|---|---|---|---|---|---|---|
| VALVE POSITIONS WITH PROPULSION REGULATION | | | | | | |
| Pressure Build-Up Right Rear | I | 0 | 0 | 0 | II | I |
| Pressure Reduction Right, Simultaneous Build-Up Left | 0 | I | 0 | II | II | I |
| Pressure Build-Up | 0 | I | 0 | I | II | I |

TABLE-continued
VALVE POSITIONS WITH PROPULSION REGULATION

| Regulating Phases of The Propulsion Regulation | Pressure Inlet Control Valve 61 | Pressure Inlet Control Valve 62 | Function Control Valve 68 | Function Control Valve 69 | ASR-Control Valve 123 | Closure Valve 127 |
|---|---|---|---|---|---|---|
| Left, Simultaneous Pressure Maintenance Right | | | | | | |
| Pressure Maintenance Left, Pressure Reduction Right | I | I | I | II | II | I |
| Pressure Maintenance Left | I | I | I | O | II | I |

In order that, for example, with pressure build-up at the left rear wheel brake 14 and simultaneous pressure reduction at the right rear wheel brake 16, the pistons 71 of the pressure modulator 37 coordinated thereto is displaceable in the sense of a volume increase of its outlet pressure space 47—by coupling the outlet pressure $P_A$ of the auxiliary pressure source 90 into the smaller control pressure space 89 of this pressure modulator 37—, the outlet pressure of the pressure reducer 113 must not be larger than the outlet pressure $P_A$ of the auxiliary pressure source multiplied with the ratio $F_2/F_1$ of the cross-sectional area $F_2$ of the smaller piston step 73 and the cross-sectional area $F_1$ of the larger piston step 72. It is thereby advantageous in order to assure a rapid response of the regulation if the output pressure of the pressure reducer 113 is smaller by about 10 to 30% than the value $P_A.F_2/F_1$.

It is correspondingly of significance for the anti-blocking regulation that the output pressure $P_A$ of the auxiliary pressure source 90 is somewhat larger than the maximum brake pressure multiplied with the ratio $F_1/F_2$ in order that the piston 71 of the respective pressure modulator can be displaced against the effect thereof on the larger piston step 72 by pressure admission of its smaller control pressure space 89 with the output pressure $P_A$ of the auxiliary pressure source 90 in the sense of a volume increase of the outlet pressure space of the respective pressure modulator.

It suffices thereby in practice if the outlet pressure $P_A$ of the auxiliary pressure source is higher by 10 to 30 bar than the mentioned value.

Depending on the selection of the values of this area ratio $F_1/F_2$ and of the reduction ratio of the pressure reducer 113 as well as of the outlet pressure of the auxiliary pressure source 90, the regulating behavior of the anti-blocking as well as of the propulsion regulation can be modified in a meaningful manner.

For enhancing the functioning safety of the ABS 11 and of the propulsion regulation installation 110, the following safety measures are additional provided whose appropriateness follows from the situation selected for the explanation.

A driving situation is to be assumed initially in which the propulsion regulation responds at relatively high velocity of, for example, 60 km/h, for example, when driving uphill an incline with moderate inclination and partially icy road surface, whereby a considerable brake pressure must be built up in the wheel brakes of the driven vehicle wheels and the piston 114 of the pressure reducer 113 reaches a position which corresponds nearly to the minimum volume of its outlet pressure space 117. It is to be further assumed that the driver during this regulating phase of the propulsion regulation must brake strongly which leads to the fact that propulsion regulation is interrupted and by reason of the road surface condition also the anti-blocking system will respond immediately. This situation could lead to the fact that, in the embodiment according to FIG. 3, practically no brake pressure can be built up, at least at the rear axle, and the brake pedal 20 "falls through" far because the brake fluid displaced into the rear axle brake circuit II by actuation of the brake device 17 would be absorbed in this case by the pressure reducer 113. In order to avoid this, in a situation in which a propulsion-regulating phase is interrupted by actuation of the brake installation 10 and immediately thereafter the anti-blocking regulation responds, the ASR-control valve 123 is activated into its closing position I, as a result of which the piston 114 of the pressure reducer 113 is hydraulically "locked", so to speak of, in its instantaneous position so that the pressure reducer 113 cannot absorb brake fluid displaced into the rear axle brake circuit II by actuation of the braking device 17.

The activation of the ASR control valve 123 into the closing position I thereof is thereby maintained for a time interval of 10 to 20 s, which means for a time interval which, in case the brake installation 10 remains actuated, would be sufficient with certainty to bring the vehicle in the meantime to standstill.

As further safety measures whose purpose is to avoid an "empty regulating" of the brake device in the regulating phases of the anti-blocking regulation, a monitoring switch 128 (FIG. 1) actuatable by the brake pedal is provided which starting from a pedal travel that in the normal condition of the braking installation 10 corresponds to a relatively high brake pressure of, for example, 50% of the maximum brake pressure, produces an electrical output signal which, if at the same time also a signal is present indicating that the anti-blocking regulation is activated, triggers an output signal of the electronic control unit 64, by means of which all function control valves 66, 67, 68 and 69 are activated into the closing position thereof, whereby the regulation is turned off as a result. This type of "turning off" of the ABS 11 is appropriate because a response of the monitoring switch 128 with simultaneous activation of the anti-blocking system 11 is to be considered as an indicia that, for example, a malfunction exists in the auxiliary pressure source 90, be it that the pump 129 thereof does not operate or that a pressure reservoir 131 provided within the scope of the auxiliary pressure source 90 cannot be charged by reason of an non-tightness, whereby these possible causes of malfunctions of the ABS are mentioned only as examples.

Furthermore, it is advantageous if the function control valves 66, 67, 68 and 69 and/or the pressure inlet control valves 58 and 59 as well as 61 and 62 of the front axle brake circuit I and of the rear axle brake circuit II are provided with hydraulic auxiliary control circuits 132, as indicated in dash lines in FIG. 1 for the pressure inlet control valves 58 and 59 of the front axle brake circuit I, by means of which the pressure inlet control valves and/or the function control valves are activated into their respective base positions 0 during an actuation of the brake installation 10. It is understood thereby that the pressure control lines of the—electromagnetic or hydraulic—control circuits provided for these valves must be dimensioned sufficiently large in order that their control functions corresponding to the regulating purpose are dominant with respect to the auxiliary circuits 132.

Referring once more to FIG. 2, the following constructive details should be pointed out:

The pressure outlet 102 and the pressure inlet 54 of the outlet pressure space 43 of the pressure modulator 33 are so arranged that the respective connecting bores of the housing part 83 terminate in the annular space forming the outlet pressure space 43 inside of the center bore step 79.

Furthermore, the free end face surface 87 of the jacket 88 of the pot-shaped piston flange 72 of the modulator piston 71 is offset by an annular recess 133 against the outer cylindrical surface of the piston flange 72 sealed off against the larger bore step 74 by means of the annular seal 99. Cross bores 136 are present in the thinner wall part 134 of the piston cylinder 88 terminating with the free end face surface 87, by way of which a communicating connection of the control connection 97 of the control pressure space 96 with the interior space of the pot-shaped piston flange 72 exists also when the latter is in a right end position according to FIG. 2, in which the end face surface 87 of the piston 71 abuts directly at the end face wall plate 86. It is assured thereby that the piston 71, after it has been displaced by pressure actuation of the first control pressure space 89—with a large force against the end face wall plate 86, remains acted upon over the far-reachingly largest part of its portion facing the second control pressure space 96 with the pressure prevailing thereat and can therefore also reliably lift off again from the end face wall plate 86.

If two pressure modulators, for example, such as the pressure modulators 36 and 37 of the rear wheel brakes, as shown in FIG. 1, are combined into a structural unit, then the larger control pressure spaces 96 thereof can also be communicatingly connected with each other by a cross bore 137 of the end wall plate 86 central in that case.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

We claim:

1. An anti-blocking system for a vehicle equipped with a hydraulic multi-circuit brake installation, comprising wheel brake means, a pressure modulator means coordinated to each wheel brake means operable to be subjected to a regulation, the pressure modulator means including an outlet pressure space operatively connected with the respective wheel brake means, braking means operable to produce a brake pressure, the brake pressure produced by said braking means being operable to be coupled by way of the outlet pressure space of the respective pressure modulator means into respective wheel brake cylinder means of the corresponding wheel brake means, the outlet pressure space of the modulator means being movably delimited by a modulator piston which also provides a pressure-tight movable boundary of the outlet pressure space with respect to a control pressure space, an auxiliary pressure source including a substantially pressureless tank, brake pressure reduction-, brake pressure build-up- and brake pressure maintenance-phases of the anti-blocking installation being controllable by the increase or reduction, respectively, keeping constant of the volume of the outlet pressure space as a consequence of the alternate pressure actuation of the control pressure space with the output pressure of the auxiliary pressure source or connection with its tank, respectively, closure against the auxiliary pressure source, return spring means operable to urge the modulator piston into its base position connected with the normal braking operation, the volume change which the outlet pressure space experiences between the end positions of the modulator piston corresponding to its minimum and its maximum volume, corresponding at least to that brake fluid volume which must be displaced per wheel brake means in its brake circuit means in order to build-up the maximum possible brake pressure, control valve arrangements individually coordinated to the pressure modulator means for controlling the pressure change and pressure maintenance-phases producing the anti-blocking regulation, the control valve arrangements each including a pressure inlet control valve means and a function control valve means which are operable to be actuated by electronic output signals of an electronic control means into function positions alternative to their respective base positions and combinations of such function positions that are linked to different regulating phases, the electronic control means producing the output signals in a regulating correct sequence and combination by processing output signals of wheel rotational speed sensor means characteristic for the movement behavior of the vehicle wheels, the pressure modulator means being constructed as differential cylinders whose housing means are provided with at least two bore steps of different diameter passing over one into the other, piston steps of correspondingly different diameters of a differential piston forming the modulator piston being displaceable to and fro in unison in the axial direction and being sealed off against the respective bore step, the piston steps each delimiting a control pressure space closed off by an end face wall of the housing means as well as an outlet pressure space of the respective pressure modulator means that remains as annular space between the piston steps, the base position of the differential piston being that which corresponds to minimum volume of the outlet pressure space and of the control pressure space delimited by the smaller piston step and maximum volume of the control pressure space, delimited by the larger piston step, the larger control pressure space movably delimited by the larger piston step being permanently connected with a main brake line of the respective brake circuit means whereas the outlet pressure spaces of the respective pressure modulator means being operable to be closed off against the respective main brake line and therewith against the coordinated pressure outlet of the braking means by means of pressure inlet control valve means connected between the outlet pressure spaces and the main brake line of the respective brake circuit means, and the function control valve means being operable to be activated from a base position in which the control pressure space of the respective pressure modulator means delimited by the smaller piston step is kept pressureless, into two function positions alternative thereto in which the control pressure space is either closed off or connected with the pressure output of the auxiliary pressure source whose output pressure is higher by a minimum amount than the maximum output pressure of the braking means multiplied by the ratio of the areas of the larger piston step to the smaller piston step.

2. An anti-blocking system according to claim 1, wherein the minimum amount by which the output pressure of the auxiliary pressure source is greater than the maximum attainable output pressure of the braking means multiplied by the ratio of the larger pressure step to the smaller pressure step has a value between about 30 bar and about 60 bar.

3. An anti-blocking system according to claim 2, wherein the minimum amount has a value of about 50 bar.

4. An anti-blocking system according to claim 3, wherein brake fluid is used as working medium in the function control circuit means leading from the auxiliary pressure source by way of the function control valve means to the control pressure spaces of the pressure modulator means delimited by the smaller piston steps.

5. An anti-blocking system according to claim 4, wherein the pressure modulator means of a brake circuit means including two wheel brake means are combined into a structural unit in which the control pressure spaces movably delimited by the larger piston steps are separated with respect to one another housing-fixedly by a common end wall plate of the housing means, and the return spring means acting on the piston of the respective pressure modulator means being supported against the end wall plate.

6. An anti-blocking system according to claim 5, wherein, as viewed in the direction of the central longitudinal axis of the respective pressure modulator means, a further control bore step is provided in the modulator housing means between the smaller bore step and the larger bore step, said further bore step linking the smaller and larger bore steps and having a diameter value between the diameters of the larger and smaller bore steps, and a pressure outlet channel by way of which a respective wheel brake cylinder means is connected to the respective pressure modulator-outlet pressure space, the pressure outlet channel terminating in the outlet pressure space inside of this further central bore step.

7. An anti-blocking system according to claim 6, wherein at least some of the pressure inlet control valve means which are connected between the outlet pressure spaces of the pressure modulator means and the respectively coordinated brake pressure outlet of the braking means, are constructed as hydraulically controlled two/two-way valves whose control circuit means are operable to be acted upon with the output pressure of the auxiliary pressure source by way of the coordinated function control valve means.

8. An anti-blocking system according to claim 7, further comprising hydraulic auxiliary control circuit means for the pressure inlet control valve means and/or the function control valve means, said last-mentioned valve means being urged by means of said hydraulic auxiliary control circuit means into their base positions under the influence of the output pressure built up by the braking means, and wherein the control circuit means provided for shifting said last-mentioned valve means into their energized positions are dominant.

9. An anti-blocking system according to claim 8, wherein the last-mentioned control circuit means are hydraulic or electrical control circuits.

10. An anti-blocking system according to claim 8, further comprising pedal travel monitoring switch means which starting with a predetermined pedal travel that corresponds to a middle expected value of the brake pressure, produces an electrical output signal which with the simultaneous presence of a signal indicating the activation of the anti-blocking regulation, triggers the shifting of all function control valve means into the closing position thereof.

11. An anti-blocking system according to claim 10, wherein the middle expected value is about 50% of the maximum brake pressure.

12. An anti-blocking system according to claim 1, for a vehicle equipped also with a propulsion regulation installation operating according to the principle to decelerate a driven vehicle wheel tending to slip by activation of its wheel brake means to such an extent that its drive slippage remains within a value range compatible with a good propulsion acceleration as also with good driving stability, the propulsion regulation installation utilizing the function elements including pressure modulator means and control valve arrangement provided for the anti-blocking regulation, for the control of braking pressure build-up-, braking pressure maintenance- and braking pressure reduction-phases of the propulsion regulation, further comprising pressure reducer means, a pressure derived from the output pressure of the auxiliary pressure source being operable to be coupled into the main brake line of a brake circuit means which includes a wheel brake means belonging to a driven vehicle wheel, said pressure reducer means being controlled by electrical output signals of the electronic control means, the pressure derived from the output pressure of the auxiliary pressure source being smaller by a predetermined fraction of about 20% to about 30% than the value $P_A F_2/F_1$, where $F_1$ is the cross-sectional area of the larger piston step and $F_2$ the cross-sectional area of the smaller piston step of the modulator piston, and wherein the pressure outlet of the braking means, which is connected to the brake circuit means in which the propulsion regulation becomes effective, is operable to be closed off against the main brake line into which the outlet pressure of the pressure reducer means is coupled, by means of a two/two-way valve means, whose base position is the passing position, triggered by a signal linked with the activation of the propulsion regulation.

13. An anti-blocking and propulsion regulation system according to claim 12, wherein a three/three-way solenoid valve means is connected as ASR-control valve between the pressure inlet of the pressure reducer means and the output of the auxiliary pressure source, the base position of the ASR-control valve being a through-flow position in which the pressure inlet of the pressure reducer means is operatively connected with the tank of the auxiliary pressure source, and the ASR control valve being operable to be activated by alternative output signals of the electronic control means into alternative energized positions in which the pressure inlet of the pressure reducer means is closed off against the tank as also against the output of the auxiliary pressure source and in the alternative, is operatively connected with the pressure output of the auxiliary source and closed off against the tank.

14. An anti-blocking and propulsion regulation system according to claim 13, wherein the electronic control means is operable to produce an output signal in case of an interruption of a propulsion regulating phase by the start of a braking also causing the anti-blocking regulation to be activated, the ASR control valve being activated by said last-mentioned output signal into its closing position and being kept in the closing position for a minimum time interval of about 10 to about 20 s.

15. An anti-blocking and propulsion regulation system according to claim 14, wherein the pressure inlet control valve means as also the function control valve means are constructed as electrically controllable valves.

16. An anti-blocking and propulsion regulation system according to claim 15, characterized wherein the two/two-way valve means connected between the connecting place of the pressure reducer means with the main brake line and the coordinated pressure outlet of the braking means is constructed as valve hydraulically controllable with the inlet pressure of the pressure reducer means.

17. An anti-blocking and propulsion regulation system according to claim 12, wherein the electronic control means is operable to produce an output signal in case of an interruption of a propulsion regulating phase by the start of a braking also causing the anti-blocking regulation to be activated, the ASR control valve being activated by said last-mentioned output signal into its closing position and being kept in the closing position for a minimum time interval of about 10 to about 20 s.

18. An anti-blocking and propulsion regulation system according to claim 12, wherein the pressure inlet control valve means as also the function control valve means are constructed as electrically controllable valves.

19. An anti-blocking and propulsion regulation system according to claim 12, characterized wherein the two/two-way valve means connected between the connecting place of the pressure reducer means with the main brake line and the coordinated pressure outlet of the braking means is constructed as valve hydraulically controllable with the inlet pressure of the pressure reducer means.

20. An anti-blocking system according to claim 1, wherein brake fluid is used as working medium in the function control circuit means leading from the auxiliary pressure source by way of the function control valve means to the control pressure spaces of the pressure modulator means delimited by the smaller piston steps.

21. An anti-blocking system according to claim 1, wherein the pressure modulator means of a brake circuit means including two wheel brake means are combined into a structural unit in which the control pressure spaces movably delimited by the larger piston steps are separated with respect to one another housing-fixedly by a common end wall plate of the housing means, and the return spring means acting on the piston of the respective pressure modulator means being supported against the end wall plate.

22. An anti-blocking system according to claim 1, wherein, as viewed in the direction of the central longitudinal axis of the respective pressure modulator means, a further control bore step is provided in the modulator housing means between the smaller bore step and the larger bore step, said further bore step linking the smaller and larger bore steps and having a diameter value between the diameters of the larger and smaller bore steps, and a pressure outlet channel by way of which a respective wheel brake cylinder means is connected to the respective pressure modulator-outlet pressure space, the pressure outlet channel terminating in the outlet pressure space inside of this further central bore step.

23. An anti-blocking system according to claim 1, wherein at least some of the pressure inlet control valve means which are connected between the outlet pressure spaces of the pressure modulator means and the respectively coordinated brake pressure outlet of the braking means, are constructed as hydraulically controlled two/two-way valves whose control circuit means are operable to be acted upon with the output pressure of the auxiliary pressure source by way of the coordinated function control valve means.

24. An anti-blocking system according to claim 1, further comprising hydraulic auxiliary control circuit means for the pressure inlet control valve means and/or the function control valve means, said last-mentioned valve means being urged by means of said hydraulic auxiliary control circuit means into their base positions under the influence of the output pressure built up by the braking means, and wherein the control circuit means provided for shifting said last-mentioned valve means into their energized positions are dominant.

25. An anti-blocking system according to claim 1, further comprising pedal travel monitoring switch means which starting with a predetermined pedal travel that corresponds to a middle expected value of the brake pressure, produces an electrical output signal which with the simultaneous presence of a signal indicating the activation of the anti-blocking regulation, triggers the shifting of all function control valve means into the closing position thereof.

* * * * *